Dec. 15, 1953  L. E. HARPER  2,662,665
CONTROLLING APPARATUS
Original Filed July 3, 1946  2 Sheets-Sheet 1

INVENTOR.
LYNDUS E. HARPER
BY Alfred R. Fuchs
ATTORNEY

Dec. 15, 1953 — L. E. HARPER — 2,662,665
CONTROLLING APPARATUS
Original Filed July 3, 1946 — 2 Sheets-Sheet 2
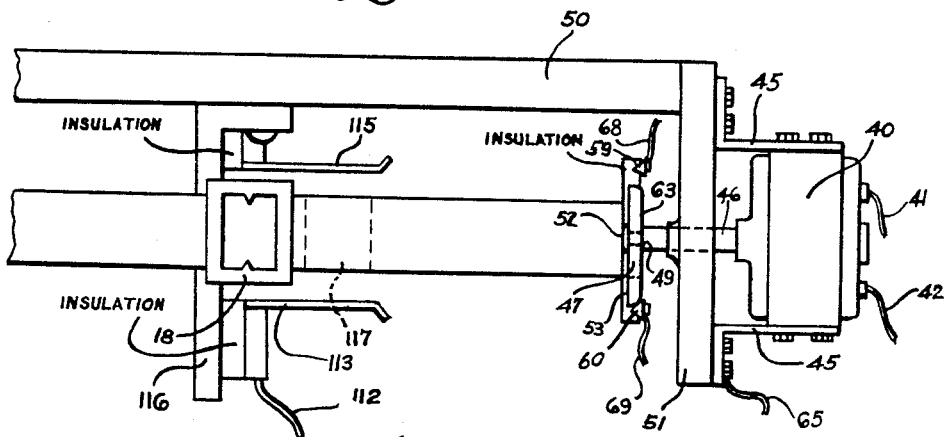
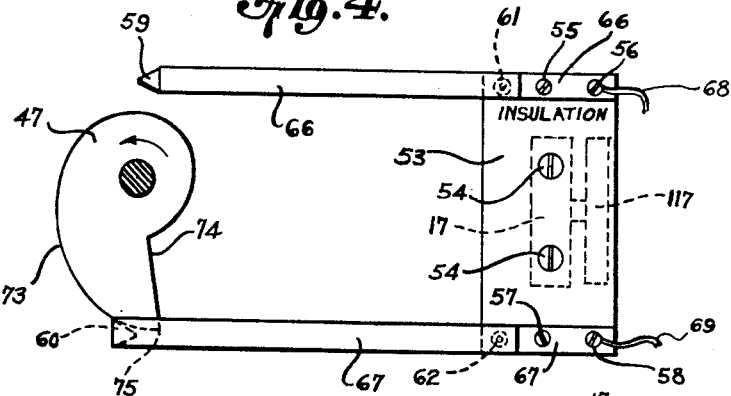
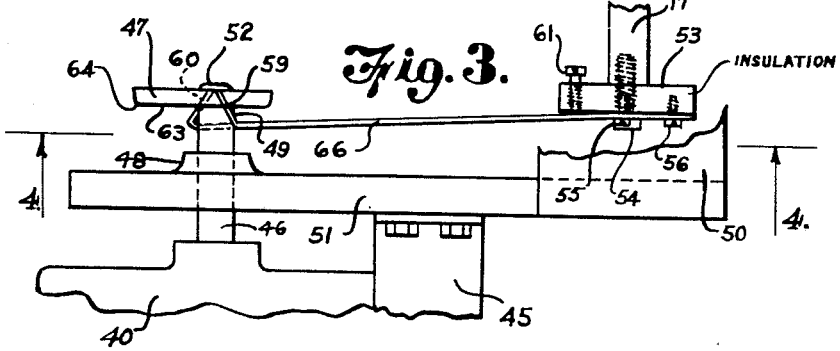
INVENTOR.
LYNDUS E. HARPER
BY Alfred R. Fuchs
ATTORNEY Patented Dec. 15, 1953

2,662,665

UNITED STATES PATENT OFFICE 2,662,665

CONTROLLING APPARATUS

Lyndus E. Harper, Skokie, Ill., assignor to Omega Machine Company, Providence, R. I., a corporation of Missouri Original application July 3, 1946, Serial No. 681,385, now Patent No. 2,637,434, dated May 5, 1953. Divided and this application October 23, 1951, Serial No. 252,747

11 Claims. (Cl. 222—55)

My invention relates to controlling apparatus, and more particularly to such an apparatus for maintaining a predetermined rate of continuous output of the controlled device. This application is a division of my application Serial No. 681,385, filed July 3, 1946, now Patent No. 2,637,434, dated May 5, 1953, on Belt Type Gravimetric Feeder.

My invention particularly relates to controlling apparatus for controlling a rate of output adjusting member that is movable in one direction to increase the rate of output and in the other direction to decrease the rate of output, said controlling means controlling the movement of said adjusting member and the direction of said movement, and comprising a circuit for controlling movement of the adjusting member in one direction and a circuit for controlling the movement of the adjusting member in the opposite direction, and means for selecting and closing the proper circuit to change the adjustment of the device in the proper direction to maintain said predetermined rate of output.

It is a further purpose of my invention to provide a device of the above mentioned character that is provided with an exact proportioning control. In the invention as illustrated in the drawings, a weight responsive means is provided for adjusting the feeding means, said weight responsive means controlling the position of a member that controls the operation of the circuit selecting means above referred to. In the particular apparatus illustrated in the drawings, the controlling means controls feeding means and said controlling means will adjust the rate of feed as soon as the scalebeam or similar weight responsive member or other member responsive to the rate of output of the device moves out of balanced or normal position and will continue to adjust the feeding or similar means to remedy the rate of output to restore the member to balanced or normal position by changing the adjustment of the output adjusting member, such as the feeding means, all of the time that the member responsive to the rate of output is out of its normal or balanced position, and by maintaining the output adjusting member in its adjusted position all of the time that the output responsive or weight responsive member is in its normal, predetermined or balanced position.

It is a further purpose of my invention to provide controlling means that comprises means that not only adjusts the rate of output the whole time that the rate of output responsive member, such as a scalebeam, is not in normal or balanced position, but which adjusts the output adjusting member in accordance with the direction of movement of the output responsive member out of normal position and in accordance with the amount of such movement, thus adjusting the rate of output, such as the rate of feed of a feeding member, in proportion to the amount that the scalebeam or similar output responsive member is out of balance or out of normal position due to the fact that the rate of feed or output is not the desired rate of feed or output.

More particularly my invention comprises controlling means, including electrically actuated means for adjusting the rate of output controlling member so as to maintain a constant rate of output, and means for controlling the operation of the electrically actuated means which closes the circuit to operate the electrically actuated means for adjusting the output controlling member for a length of time proportional to the amount of movement of the output responsive member out of normal position and thus proportional to the amount that the rate of output is out of adjustment.

In the specific form of the invention illustrated, the controlling means is shown as being used for controlling feeding means and the controlling means comprise scales that have means thereon for supporting a predetermined length of a conveyor to which material is fed, and a scalebeam that has an adjustable weight thereon for controlling the rate of feed of the feeding means, to feed the amount of material to counterbalance said weight onto a length of said conveyor equal to that being weighed at any one time by the scales, the means for controlling the feeding means comprising a circuit controlling means affected by the position of the scalebeam in such a manner that controlling circuits are closed for periods dependent upon the amount that the scalebeam is out of balance, to change the adjustment of the feeding means in direct proportion to the amount that the scalebeam is out of balance due to the rate of feed of the material being different from that to which the weight responsive means is adjusted.

Preferably, my improved controlling means comprises a cam member rotated at a constant rate of speed, which is so shaped that a flexibly mounted member will be in contact with the cam member for a length of time dependent upon the amount that the scalebeam or similar output responsive member is out of balanced position, or out of normal position, to control an adjusting circuit to close it for a corresponding length of time.

It is a particular purpose of my invention to provide controlling means of the above mentioned character, that includes a motor which is reversible and which operates at a constant rate, so that the length of time of operation thereof will determine the amount of movement of a part driven by the motor in a given direction, and thus the amount that the apparatus being controlled is adjusted in that particular direction, the operation of said reversing motor being controlled by means of an output responsive device, such as a scalebeam, through means such as above described, so as to operate in a direction dependent upon the direction in which the scalebeam or other output responsive member is out of normal position, and for a length of time determined by the amount that such an output responsive member is out of such normal position.

It is a very important purpose of my invention to provide controlling apparatus of the above mentioned character that is so arranged that when the output responsive member, such as the scalebeam, is in its normal or balanced position, the controlling circuits will remain open so that the adjusting member will remain in its previously adjusted position as long as said output responsive member remains in its normal position.

It is another important purpose of my invention to provide controlling means of the above mentioned character, that is so constructed and arranged that the contact pressure of electrical contact means that may be used as a part thereof, will have no effect on the balance or movement of the scalebeam or other output responsive member in the direction in which it moves when responding to the weight that is on the predetermined length of conveyor that is operating over the weighing means or other output measuring means.

Other objects and advantages of my invention will appear as the description of the drawings proceeds. I desire to have it understood, however, that I do not intend to limit myself to the particular details shown or described, except as defined in the claims.

In the drawings:

Fig. 2 is a fragmentary elevational view on an enlarged scale, partly broken away, of the contact operating end of the scalebeam, and cooperating means for controlling the rate of output of the device controlled by my improved controlling apparatus.

Fig. 3 is a fragmentary top plan view of the cooperating contacts and associated parts, and Fig. 4 is an elevational view, taken partly in section, substantially on the line 4—4 of Fig. 3, with the parts in the position shown in Fig. 2.

Figure 1:
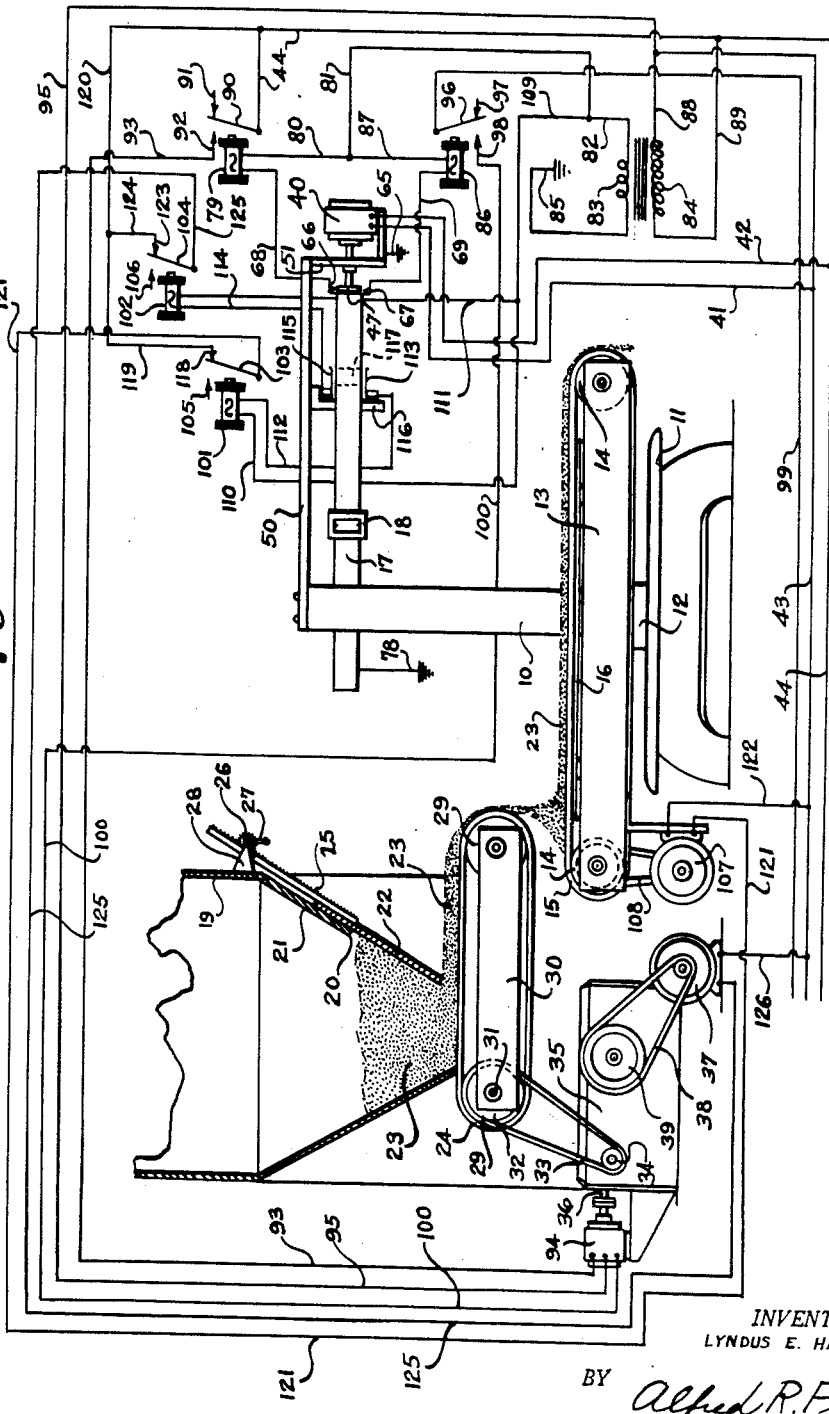
Fig. 1 is a diagrammatical view partly in elevation and partly in section, showing my improved controlling apparatus as applied to one form of feeding means.

Referring in detail to the drawings, my improved controlling apparatus is shown as being applied to a feeding device that comprises a scale 10 having a platform 11 upon which is mounted in any suitable manner, as by means of a frame having a portion 12 mounted on the platform, and side members 13 mounted on said member 12, the rollers 14 over which the conveyor belt 15 operates. Said side members 13 may be provided with a guide plate 16 underlying the conveyor belt 15 between the rollers 14 to support the belt and prevent sagging thereof, should this be found desirable. The weight of material that is on the conveyor belt 16 between the rollers 14 will operate the scale mechanism to determine the position of the scalebeam 17, the scale mechanism being of any suitable character, such as ordinarily provided for platform scales, and not being shown in the drawings, as the particular structure thereof is not a part of this invention. A sliding weight 18, or similar member, is provided on the scalebeam for adjusting the apparatus to obtain a balance of the scalebeam when the desired rate of feed of material is taking place that the amount of material fed, that is on the conveyor belt between the rollers 14, will exactly counterbalance the weight 18. Obviously a scale can be provided on the scalebeam that will indicate the rate of feed in any desired units for the setting of the weight 18 along the length of said scalebeam.

In the form of the invention shown in Fig. 1 the material that is fed to the conveyor belt 16 is fed from a hopper 19, which has an opening 20 in an inclined bottom wall 21 thereof, the size of which is adjustable by means of a slide 22, so as to obtain the desired rate of feed through said opening of the material 23 that is in the hopper to a conveyor belt 24. The position of the slide or door 22 is, preferably, determined by manually adjustable means, comprising any suitable self-locking adjusting means, such as the rack 25 and pinion 26, the rack 25 being fixed on the slide 22 and the pinion 26 engaging said rack and being rotated by means of a crank 27, the shaft carrying said crank 27 and pinion 26 being mounted in any suitable manner on the body of the hopper 19, as by means of bracket members 28.

The conveyor belt 24 operates over a pair of rollers 29, which are mounted in any suitable manner on a frame having the longitudinally extending members 30, the shaft 31 of the roller 29 having a pulley 32 fixed thereon, over which a belt 33 operates, which is driven by means of a pulley 34 of a variable speed transmission 35, the output speed of which is the speed of the pulley 34 and is exactly proportional to the position of a follower, or followers, along the axis of a cam, or cams, which are rotated at a constant speed, said variable speed transmission being of substantially the same character as that shown in my Patent No. 2,404,231, on Variable Speed Transmission, patented July 16, 1946. The axial adjustment of the followers of the variable speed transmission 35 is determined by means of the shaft 36, rotation of said shaft in one direction adjusting the followers in a direction parallel to the axis of the cam shaft in such a direction as to increase the rate of rotation of the output pulley 34, and rotation of the shaft 36 in the reverse direction adjusting said followers in a direction parallel to the axis of the cam shaft so as to decrease the rate of rotation of the output pulley 34. The means for driving the variable speed transmission comprises a constant speed motor 37, which drives a belt 38 that operates over a pulley 39 on the input shaft of the variable speed transmission 35.

Mounted adjacent the scalebeam 17 is a constant speed electric motor 40, the same being, preferably, a small synchronous alternating current motor, such as ordinarily utilized for operating small mechanisms, such as electric clock mechanisms. Conductors 41 and 42 extend from the line wires 43 and 44 to said motor 40 to constantly rotate the same at a constant speed. The motor 40 is shown as being mounted on the horizontal frame member 50 of the scale 10 (see Figs. 2 and 4), being mounted by means of angle brackets 45 on a bracket 51 depending from the frame member 50. The motor 40 has a shaft 46 on which is fixed a cam 47 to rotate therewith, said shaft operating in a bearing 48 in the bracket 51, and having any suitable means for holding said cam in fixed position axially of said shaft, said shaft being, preferably, provided with a reduced portion to provide a shoulder at 49, suitable means 52 being provided to hold said cam against the shoulder 49 so that the same will be in position to properly cooperate with the contact members to be described below.

The insulating bracket 53 is fixed on the end of the scalebeam in any suitable manner, as by means of the screws 54. Secured to said bracket 53 of insulation by means of the screws 55 and 56 is a contact member 66 of resilient material, and secured to said bracket 53 by means of screws 57 and 58 is a contact member 67 of resilient material. The contact member 66 has an end portion 59 extending at an oblique angle to the body portion of said contact member and tapering to a blunt contact point, and the contact member 67 has an obliquely extending portion 60 bent back on itself and tapering to a blunt contact point.

An adjusting screw 61 is provided for the contact member 66 and a similar adjusting screw 62 is provided for the contact member 67, by means of which said contact members can be aligned with the cam 47 so that the blunt ends of the obliquely extending portions of said contact members will engage the face 63 of the cam 47 with a light spring pressure sufficient to make a good electrical contact whenever either the member 66 or 67 is moved into position to make such contact, by movement of the scalebeam 17.

It will be noted that the cam member 47 has a gradually rising peripheral face 73, which terminates in an offset or shoulder 74, joining the low point of said cam with the high point thereof. In the position of the parts shown in Figs. 2, 3 and 4 the contact members 66 and 67 are just cleared by the high point 75 of the cam. There is no necessity for any great amount of mechanical clearance, due to the fact that a very low voltage current will pass through the circuit in which the contacts 66 or 67 are located. Should the scalebeam become slightly out of balance due to an excessive amount of material 23 being fed by the conveyor member 24 to the conveyor member 15, the shoulder 74 on the cam member 47 will engage the contact member 66, moving it from the position shown in Fig. 4 into a position so as to slide along on the face 63 of the cam 47. The contact 66 will be, in effect, brushed aside, to the extent that it will lightly engage said face 63 of the cam 47, the blunt point on said contact member 66 riding along on the face 63 until it intersects the rising face 73 of the cam, whereupon it is immediately sprung back to its normal position. The cam is provided with a beveled or rounded edge 64 leading from the peripheral edge of said cam to the face 63, to guide the contact members into engagement with said face.

It will be obvious that the rising face 73 of the cam can be so shaped that the end of the contact 66, or the corresponding end of the contact 67, will engage the face 63 of the cam 47 for a period of time that will be in proportion to the amount that the scalebeam is out of balance, and that if the scalebeam is out of balance as much or more than the height of the offset or shoulder 74, the contact of the cam face with the particular contact member 66 or 67, as the case may be, will be continuous until the feed is adjusted in a manner to be described below, to restore the scalebeam to a balanced condition. Preferably, the rate of rotation of the cam 47 and the speed of the conveyor 15 is such that a length of conveyor 15 equal to that located between the pulleys 14 will pass over the scale for each rotation of the cam shaft 46. While this arrangement is preferred, any fixed ratio of the rate of rotation of the cam shaft and the rate of travel of the conveyor belt 15 can be utilized that may be preferable.

It will be obvious that if the cam 47 rotates once for each length of conveyor belt equal to that between the pulleys 14 that is weighed, if the adjustment of the feed is accomplished by a single rotation of the cam 47 actuating the controlling device to accomplish such adjustment, the scalebeam 17 will again be balanced, and on the next rotation of the cam the high point 75 of the cam will clear the contact 66 and no further adjustment of the feeding means will occur. If the adjustment has not been completely successful in getting the proper rate of feed for which the device is set, then on the next rotation of the cam 47 a contact will again be made in the manner above described, but of a much shorter duration, to further adjust the feeding means in a proper direction to obtain the desired rate of feed and to balance the scalebeam 17. It will be noted that due to this manner of operation of the device by proper design of the cam, there will be no so-called "hunting" of the apparatus to obtain a balance of the scalebeam, that is, the scalebeam will not first be thrown out of balance in one direction and then in another direction, due to the fact that the adjusting means will adjust the feed too much first in the one direction, causing an overbalance in the one direction, and necessitating another adjustment in the other direction to correct that overbalance.

Referring to Fig. 1 it will be noted that the scalebeam 17 is provided with a ground connection 78. The metallic bracket 51 or any other convenient part of the frame conductively connected with the cam 47 through the shaft 46 has a conductor 65 extending therefrom, which constitutes a ground connection. The contact 66 is connected through the conductor 68 with the winding of a relay 79, which is connected through the conductors 80, 81 and 82 with the secondary winding 83 of a transformer having a primary winding 84, the other end of the secondary winding being connected with the ground connection 85. The contact 67 is connected through conductor 69 with the winding of a relay 86, from which the conductor 87 leads to the conductor 81 connected with the secondary 83 of the transformer in the manner above described. The primary 84 of said transformer is connected with the line wires 43 and 44 by means of the conductors 88 and 89. The conductors 68 and 69 are connected with the contact members 66 and 67, respectively, through screws 56 and 58, which also serve as binding screws. Accordingly, when the contact 66 engages the cam 47 the relay 79 is operated, and when the contact 67 engages the cam 47 the relay 86 is actuated.

When the winding of the relay 79 is energized to attract the armature 90, which is normally biased to engage the stop member 91, said armature 90, which is a switching element, engages the switching element 92 to connect the conductor 93 with the conductor 44. The conductor 93 leads to one terminal of the reversing motor 94, which drives the shaft 36. A conductor 95 extends from the central terminal of the motor 94 to the conductor 43. The terminals to which the conductors 93 and 95 are connected are such that when the circuit is completed through these conductors to the motor 94 it will be rotated in a direction to rotate the shaft 36 in the proper direction to increase the speed of the shaft 34 by means of the variable speed transmission 35. Thus, when the scalebeam 17 lowers out of balanced position the circuit to the motor 94 will be closed to adjust the variable speed transmission, to increase the speed of the output pulley 34 and thus of the conveyor belt 24 and this adjustment will continue as long as the contact 66 engages the cam 47, which will be as long as the scalebeam 17 is out of balance, so as to be below its normal or balanced position. This adjustment will obviously adjust the amount of material 23 fed to the conveyor belt 15, so as to obtain the rate of feed desired for the setting of the adjustable weight 18 on the scalebeam 17.

On the other hand, if the contact 67 engages the cam 47, because the scalebeam 17 is raised above its balanced position, then the relay 86 will be energized, attracting the armature 96, which is normally biased to engage the stop means 97, causing the armature, which is a switching member, to engage the stationary contact 98, completing the circuit between the line conductor 99, and the conductor 100, which leads to the third pole of the motor 94. The conductor 99 has such phase relation to the conductor 44 that when the conductors 43 and 99 are connected with the terminals of the motor 94 through the conductors 95 and 100 the direction of rotation of the motor 94 will be reversed, and the direction of rotation of the shaft 36 will be reversed, thus causing an adjustment of the variable speed transmission 35 such that the rate of rotation of the pulley 34 will be decreased and the rate of feed of the material 23 by means of the conveyor belt 24 will be decreased, so that the scalebeam 17 will be brought back into a balanced position due to the fact that the proper amount of material is being fed over the length of the conveyor 15 located between the pulleys 14 to counterbalance the weight 18 for the adjusted position of said weight, this being accomplished in a similar manner to that above described in connection with the contact member 66.

The variable speed mechanism is so constructed that the adjustment of the rate of rotation of the pulley 34 on the output shaft of the variable speed transmission will be in direct proportion to the amount that the shaft 36 rotates in a given direction. Thus the length of time that the circuit is closed to the motor 94 through either the conductors 93 and 95, or the conductors 95 and 100, will determine the amount of adjustment of the speed of the output shaft on which the pulley 34 is mounted and thus of the speed of the conveyor 24, which determines the rate of feed to the weighing conveyor 15.

Means is provided for halting the operation of the conveyor 15 in case the hopper 19 becomes empty, and for halting the operation of the conveyor 24 should there for some reason be such a great over-supply of material 23 being fed thereto that the normal adjusting means does not promptly adjust the rate of travel of the conveyor 24 to feed the proper amount of material 23 to the conveyor 15. The means provided for this purpose prevents any excessive underload or overload of the conveyor 15. Said means comprises a relay 101 and a relay 102, the relay 101 being provided with an armature 103, and the relay 102 with an armature 104, the armature being so biased in the case of each relay that it will engage normally with a contact to close the circuit when the windings of the relays 101 or 102 are not energized, and engage the stops indicated at 105 and 106 when said windings are energized. The relay 101 controls the operation of the motor 107, which drives the conveyor 15 through the belt 108, while the relay 102 controls the operation of the motor 37, which drives the variable speed mechanism 35 and thus the conveyor 24.

A conductor 109 extends from the conductor 82 and has branches 110 and 111 that are each connected to one end of the windings of the relays 101 and 102, respectively. A conductor 112 leads from the winding of the relay 101 to a flexible contact member 113 and a conductor 114 leads from the other end of the winding of the relay 102 to a flexible contact member 115. The contact members 113 and 115 are insulatingly mounted on a bracket 116 depending from the member 50 of the scale. The said contacts engage any suitable means mounted on the scalebeam 17 out of alignment with the weight 18, so as to not interfere with the adjustment thereof and can readily engage a rigid contact 117 mounted on a rearwardly extending bracket on said scalebeam, upon the scalebeam being moved a predetermined amount out of balanced position. Thus, if the scalebeam 17 drops further than would normally occur due to such variations in the feed as can be properly adjusted by means of the previously described rate of feed adjusting means, or under excessive underload on the conveyor 15, or emptying of the hopper 19, the circuit through the winding of the relay 101 will be completed through the conductors 82, 109, 110, 112, contact 113, contact 117, and through the scalebeam 17 to the ground connection 78, whereupon the armature 103 will be attracted so as to open the circuit to the motor 107, which is normally closed due to engagement of the contact 103 with a stationary contact 118, which is connected by means of the conductor 119 with a conductor 120 extending from the line wire 44, the movable contact member or armature 103 being connected by means of the conductor 121 with one terminal of the motor 107, the other terminal of which is connected with the line wire 43 by means of a conductor 122. Thus, when the parts are in the position shown in Fig. 1, the circuit for operating the motor 107 extends from the line wire 44 through the conductors 120, 119, 121 and 122, to the line wire 43, and upon excessive underload on the conveyor 15 the circuit is opened by means of the relay 101 to stop the operation of the motor 107.

The movable switching member or armature 104 cooperates with a fixed contact member 123, which is connected through a conductor 124 with the conductor 120, while the armature or movable contact member 104 is connected with a conductor 125, which extends to one terminal of the motor 37, the other terminal of the motor being connected by a conductor 126 with the line wire 43. Accordingly, the circuit through the motor 37 is completed when the parts are in the position shown in Fig. 1 from the line wire 44 through the conductors 120, 124, 125, and the conductor 126 to the line wire 43. However, if there is an excessive amount of material being supplied to the conveyor 24 so as to cause an overload of the material 23 to be fed to the conveyor 15, such that the rate of feed adjusting means can not properly take care thereof quickly, the scalebeam 17 will rise so that the contact member 115 will be engaged by the contact 117, which will close the circuit through the winding of the relay 102 through the conductors 82, 109, 111, 114, contact member 115, contact 117, and the scalebeam 17 to the ground connection 78, causing the armature 104 to be attracted, breaking the operating circuit of the motor 37 and thus stopping the operation of the conveyor 24 until the overload condition on the conveyor 15 has been corrected, due to the fact that no material is being fed to the conveyor 15 from the conveyor 24.

When the scalebeam is in balance the rate of feed will be maintained due to the fact that the contact member 47 will be out of engagement with both contacts 66 and 67. In case the rate of feed is less than it should be, then the circuit will be completed by engagement of the member 47 with the contact 66 to speed up the belt 24 the proper amount to obtain the desired rate of feed to correct the deficiency in the rate registered by the descent of the scalebeam sufficiently to cause disengagement of the members 47 and 66. When the contact 47 engages the contact 67, the reverse movement of the parts will take place to reduce the rate of feed to bring the scalebeam 17 back into balance. If the scalebeam is in balance there will be no change in the rate of feed. Thus a controlling means is provided, which will, under all normal operating conditions, maintain substantially a steady rate of output at the desired rate for which the apparatus is adjusted, without any so-called "hunting" action or adjustment back and forth through the balanced or normal condition of the weighing means or other output responsive member.

What I claim is:

1. Controlling apparatus for maintaining a predetermined rate of continuous output of a device, comprising a rate of output adjusting member movable in one direction to increase said rate of output and in the opposite direction to decrease said rate of output, and means controlling the movement of said adjusting member and the direction of said movement, comprising a circuit for controlling movement of said adjusting member in one direction, a circuit for controlling movement of said adjusting member in the opposite direction, a member mounted for movement in opposite directions, said member having a position determined by the rate of output of said device and having a predetermined position as long as said output is at said predetermined rate and moving to positions on opposite sides of said predetermined position whenever the rate of output of said device is above or below said predetermined rate, and cooperating means for selecting one of said circuits responsive to the position of said output rate responsive member, said cooperating means including means continuously rotating in the same direction, and means engaging with said continuously rotating means upon movement of said member out of said predetermined position in either direction to select a circuit and close said selected circuit to change the adjustment of said device, one of said cooperating means being mounted to move with said member, and means for opening both said circuits to maintain the adjustment of said device upon disengagement of said cooperating means, said output rate responsive member holding said cooperating means out of engagement when in its predetermined position.

2. Controlling apparatus for maintaining a predetermined rate of continuous output of a device, comprising a rate of output adjusting member movable in one direction to increase said rate of output and in the opposite direction to decrease said rate of output, and means controlling the amount of movement of said adjusting member and the direction of said movement, comprising a circuit controlling the amount of movement of said adjusting member in one direction, a circuit controlling the amount of movement of said adjusting member in the opposite direction, a member mounted for movement in opposite directions, said member having a position determined by the rate of output of said device and having a predetermined position as long as said output is at said predetermined rate and moving to positions on opposite sides of said predetermined position whenever the rate of output of said device is above or below said predetermined rate, cooperating means for selecting one of said circuits responsive to the position of said output rate responsive member, said cooperating means including means continuously rotating in the same direction, and means engaging with said continuously rotating means, and means for moving one of said cooperating means with said output rate responsive member to select one of said circuits and close said selected circuit to change the adjustment of said device upon movement of said output rate responsive member out of said predetermined position, said cooperating means being related to maintain the closed condition of said selected circuit for an interval determined by the amount of movement of said rate responsive member out of said predetermined position, and means for moving said adjusting member in the direction controlled by the selected circuit as long as said circuit remains closed and open both said circuits to maintain the adjustment of said device upon said output rate responsive member moving into said predetermined position.

3. Controlling apparatus for maintaining a predetermined rate of continuous output of a device, comprising a rate of output adjusting member determining the rate of output of said device by its position, said adjusting member being movable in one direction to increase said rate of output and in the opposite direction to decrease said rate of output, and means controlling the amount of movement of said adjusting member and the direction of said movement, comprising a circuit for controlling movement of said adjusting member in one direction, a circuit for controlling movement of said adjusting member in the opposite direction, a member mounted for movement in opposite directions, said member having a position determined by the rate of output of said device and having a predetermined position as long as said output is at said predetermined rate and moving to positions on opposite sides of said predetermined position whenever the rate of output of said device is above or below said predetermined rate a distance dependent upon the variation of the output of said device from said predetermined rate, and cooperating means for selecting one of said circuits responsive to the position of said output rate responsive member, said cooperating means including means continuously rotating in the same direction and circuit closing means controlled by said rotating means and the position of said output rate responsive member to select a circuit and close said selected circuit to change the adjustment of said device upon movement of said output rate responsive member out of said predetermined position, and means for moving said adjusting member in the direction controlled by the selected circuit as long as said circuit remains closed, said cooperating means opening both said circuits to maintain the adjustment of said device whenever said output rate responsive member is in said predetermined position, said rotating member being so shaped that said selected circuit will be closed to continue changing the adjustment of said device for an interval proportional to the amount of movement of said output rate responsive member out of said predetermined position.

4. Controlling apparatus for maintaining a predetermined rate of continuous output of a device, comprising a rate of output adjusting member determining the rate of output of said device by its position, said adjusting member being movable in one direction to increase said rate of output and in the opposite direction to decrease said rate of output, and means controlling the amount of movement of said adjusting member and the direction of said movement, comprising a circuit for controlling movement of said adjusting member in one direction, a circuit for controlling movement of said adjusting member in the opposite direction, a member mounted for movement in opposite directions, said member having a position determined by the rate of output of said device and having a predetermined position as long as said output is at said predetermined rate and moving to positions on opposite sides of said predetermined position whenever the rate of output of said device is above or below said predetermined rate a distance dependent upon the variation of the output of said device from said predetermined rate, and cooperating means for selecting one of said circuits responsive to the position of said output rate responsive member, said cooperating means including rigid cam-like means of fixed contour continuously rotating in the same direction and circuit closing means controlled by said rotating means and the direction and distance of said output rate responsive member from said predetermined position to select a circuit and close said selected circuit to change the adjustment of said device upon movement of said output rate responsive member out of said predetermined position, said cam-like member being so shaped as to open both said circuits to maintain the adjustment of said device whenever said output rate responsive member is in said predetermined position and close the selected circuit for an interval proportional to the distance said rate responsive member is out of said predetermined position.

5. Controlling apparatus for maintaining a predetermined rate of continuous output of a device, comprising a rate of output adjusting member determining the rate of output of said device by its position, said adjusting member being movable in one direction to increase said rate of output and in the opposite direction to decrease said rate of output, and means controlling the amount of movement of said adjusting member and the direction of said movement, comprising a circuit for controlling movement of said adjusting member in one direction, a circuit for controlling movement of said adjusting member in the opposite direction, a member mounted for movement in opposite directions, said member having a position determined by the rate of output of said device and having a predetermined position as long as said output is at said predetermined rate and moving to a position on opposite sides of said predetermined position whenever the rate of output of said device is above or below said predetermined rate a distance dependent upon the variation of the output of said device from said predetermined rate, and cooperating means for selecting one of said circuits responsive to the position of said output rate responsive member, said cooperating means including rigid cam-like means of fixed contour continuously rotating in the same direction and circuit closing means controlled by said rotating means and the direction and distance of said output rate responsive member from said predetermined position to select a circuit and close said selected circuit to change the adjustment of said device upon movement of said output rate responsive member out of said predetermined position, and means for moving said adjusting member in the direction controlled by the selected circuit as long as said circuit remains closed, said cam-like member being so shaped as to open both said circuits to maintain the adjustment of said device whenever said output rate responsive member is in said predetermined position and that the selected circuit is maintained closed to continue changing the adjustment of said device for an interval proportional to the amount of movement of said output rate responsive member out of said predetermined position.

6. Controlling apparatus comprising an adjusting member movable in one direction to increase the output rate of the controlled device and in the opposite direction to decrease the output rate of the controlled device, and means controlling the amount and direction of movement of said adjusting member, comprising a circuit for controlling movement of said adjusting member in said one direction, a circuit for controlling movement of said adjusting member in said other direction, a member mounted for movement in opposite directions from a normal position in response to the output rate of said device, and means for closing one of said circuits upon movement of said output rate responsive member out of normal position including rotatable contact means, means for continuously rotating said rotatable contact means at a constant rate, contact means cooperating with said rotatable contact means, and means for moving one of said contact means into a position corresponding to that of said output rate responsive member.

7. Controlling apparatus comprising an adjusting member movable in one direction to increase the output rate of the controlled device and in the opposite direction to decrease the output rate of the controlled device, and means controlling the amount and direction of movement of said adjusting member, comprising a circuit for controlling movement of said adjusting member in said one direction, a circuit for controlling movement of said adjusting member in said other direction, a member mounted for movement in opposite directions from a normal position in response to the output rate of said device, and means for closing one of said circuits upon movement of said output rate responsive member out of normal position including rotatable contact means, means for continuously rotating said rotatable contact means at a constant rate, contact means cooperating with said rotatable contact means comprising a contact member in each of said circuits, and means for moving one of said contact means into a position corresponding to that of said output rate responsive member, said rotatable contact means being shaped to be out of engagement with both said contact members whenever said rate responsive member is in normal position.

8. Controlling apparatus comprising an adjusting member movable in one direction to increase the output rate of the controlled device and in the opposite direction to decrease the output rate of the controlled device, and means controlling the amount and direction of movement of said adjusting member, comprising a circuit for controlling movement of said adjusting member in said one direction, a circuit for controlling movement of said adjusting member in said other direction, a member mounted for movement in opposite directions from a normal position in response to the output rate of said device, and means for closing one of said circuits upon movement of said output rate responsive member out of normal position including rotatable contact means, means for continuously rotating said rotatable contact means at a constant rate in the same direction, contact means cooperating with said rotatable contact means comprising a contact member in each of said circuits, and means for moving one of said contact means into a position corresponding to that of said output rate responsive member, said rotatable contact means being so shaped as to engage one of said contact members for an interval proportional to the movement of said rate responsive member out of normal position.

9. Controlling apparatus comprising an adjusting member movable in one direction to increase the output rate of the controlled device and in the opposite direction to decrease the output rate of the controlled device, and means controlling the amount and direction of movement of said adjusting member, comprising a circuit for controlling movement of said adjusting member in said one direction, a circuit for controlling movement of said adjusting member in said other direction, a member mounted for movement in opposite directions from a normal position in response to the output rate of said device, and means for closing one of said circuits upon movement of said output rate responsive member out of normal position including a rotatable cam of fixed contour, means for continuously rotating said cam at a constant rate, and contact means movable with said rate responsive means comprising a contact member in each of said circuits cooperating with said cam to close its circuit only during engagement with said cam.

10. Controlling apparatus comprising an adjusting member movable in one direction to increase the output rate of the controlled device and in the opposite direction to decrease the output rate of the controlled device, and means controlling the amount and direction of movement of said adjusting member, comprising a reversing motor, a circuit for operating said motor in one direction, a circuit for operating said motor in the opposite direction, a member mounted for movement in opposite directions from a normal position in response to the output rate of said device, and means for closing one of said circuits upon movement of said output rate responsive member out of normal position including rotatable contact means, means for continuously rotating said rotatable contact means at a constant rate, contact means cooperating with said rotatable contact means, and means for moving one of said contact means into a position corresponding to that of said output rate responsive member.

11. Controlling apparatus comprising an adjusting member movable in one direction to increase the output rate of the controlled device and in the opposite direction to decrease the output rate of the controlled device, and means controlling the amount and direction of movement of said adjusting member, comprising a reversing motor, a circuit for operating said motor in one direction, a circuit for operating said motor in the opposite direction, a member mounted for movement in opposite directions from a normal position in response to the output rate of said device, and means for closing one of said circuits upon movement of said output rate responsive member out of normal position including rotatable contact means, means for continuously rotating said rotatable contact means at a constant rate, contact means cooperating with said rotatable contact means comprising a contact member in each of said circuits, and means for moving one of said contact means into a position corresponding to that of said output rate responsive member, said rotatable contact means being so shaped as to engage one of said contact members for an interval proportional to the movement of said rate responsive member out of normal position and to be out of engagement with both said contact members whenever said rate responsive member is in normal position.

LYNDUS E. HARPER.

References Cited in the file of this patent

UNITED STATES PATENTS

| Number | Name | Date |
|---|---|---|
| 404,867 | Ricketson | June 11, 1889 |
| 674,947 | Tolchard | May 28, 1901 |
| 1,151,990 | Balzer | Aug. 31, 1915 |
| 1,777,670 | Hausman | Oct. 7, 1930 |
| 1,787,176 | Spitzglass | Dec. 30, 1930 |
| 1,916,420 | Harrison | July 4, 1933 |
| 2,116,778 | Brayer | May 10, 1938 |
| 2,276,383 | Francis | Mar. 17, 1942 |
| 2,366,075 | Weyandt | Dec. 26, 1944 |
| 2,404,231 | Harper | July 16, 1946 |
| 2,637,434 | Harper | May 5, 1953 |